United States Patent [19]

Incremona et al.

[11] Patent Number: 5,028,292
[45] Date of Patent: Jul. 2, 1991

[54] ADHESIVE BONDING TO QUASI-AMORPHOUS POLYMER SURFACES

[75] Inventors: Joseph H. Incremona, Stillwater; Arthur A. Aamodt, Lakeland; Robert W. Warner, St. Paul; Andrew J. Ouderkirk, Woodbury; Douglas S. Dunn, Maplewood, all of Minn.

[73] Assignee: Minnesota Mining and Manufacturing Company, St. Paul, Minn.

[21] Appl. No.: 187,018

[22] Filed: Apr. 27, 1988

Related U.S. Application Data

[63] Continuation of Ser. No. 25,847, Mar. 16, 1987, abandoned.

[51] Int. Cl.$^5$ .............................................. B32B 31/00
[52] U.S. Cl. ............................... 156/272.6; 156/272.8; 156/273.5; 156/275.3; 156/309.6; 264/22
[58] Field of Search ................ 156/272.2, 273.5, 309.6, 156/272.8, 273.3, 275.7, 272.8, 309.9, 308.2, 272.6; 204/157.15, 157.6, 157.61; 264/25, 22; 250/492.1; 427/53.1, 54.1, 55; 428/516; 219/121

[56] References Cited

U.S. PATENT DOCUMENTS

| | | | |
|---|---|---|---|
| 2,876,187 | 3/1959 | Wolinski | 204/158 |
| 3,081,485 | 3/1963 | Steigerwald | 18/1 |
| 3,145,242 | 8/1964 | Bryan | 264/80 |
| 3,607,354 | 9/1971 | Krogh et al. | 117/47 |
| 3,914,521 | 10/1975 | Beatty et al. | 428/461 |
| 3,978,341 | 8/1976 | Hoell | 250/492 |
| 4,048,428 | 9/1977 | Baird et al. | 526/343 |
| 4,247,496 | 1/1981 | Kawakami et al. | 264/22 |
| 4,311,759 | 1/1982 | Glennon | 428/345 |
| 4,414,059 | 11/1983 | Blum et al. | 156/659.1 |
| 4,417,948 | 11/1983 | Mayne-Banton et al. | 156/643 |
| 4,482,204 | 11/1984 | Blyler et al. | 350/96.34 |
| 4,518,654 | 5/1985 | Eichbauer et al. | 428/331 |
| 4,568,632 | 2/1986 | Blum et al. | 430/322 |
| 4,631,155 | 12/1986 | Caines | 264/22 |
| 4,710,563 | 12/1987 | Oetting | 528/501 |

FOREIGN PATENT DOCUMENTS

| | | |
|---|---|---|
| 33792 | 3/1980 | Japan . |
| 82380 | 4/1984 | Japan . |
| 101937 | 5/1984 | Japan . |
| 101938 | 5/1984 | Japan . |
| 760611 | 11/1956 | United Kingdom . |
| 1117354 | 6/1968 | United Kingdom . |
| 1149812 | 4/1969 | United Kingdom . |
| 1579002 | 11/1980 | United Kingdom . |

OTHER PUBLICATIONS

Journal of American Chemical Society, 104, 6784–6785 (1982), Srinivasan & Leigh.
Bishop & Dyer, Applied Physics Letters, 47, 1229 (1985).
Srinivasan & Lazare, Polymer, 26, 1297 (1985) Conference Issue.
Srinivasan, Journal of the Vacuum Society, B1, 923 (1983).
Day and Wiles, Journal of Applied Polymer Science, 16, 175 (1972).
Blais, Day and Wiles, Journal of Applied Polymer Science, 17, 1895 (1973).
Mimura et al., Japanese Journal of Applied Physics, 17, 541 (1978).
Lazare and Srinivasan, Journal Physical Chemistry, 90, 2124 (1986).
Kawamura et al., Applied Physics Letters, 40, 374 (1982).
Polymer Interface and Adhesion, Souheng Wu, published by Marcel Dekker, Inc., New York and Basel, Chapter 5, p. 206.
Yorkgitis et al., "Polymeric Film with Reduced Surface Friction", U.S. Ser. No. 25,884, filed Mar. 16, 1987.
Ouderkirk et al., "A Process for the Surface Modification of Semicrystalline Polymers", U.S. Ser. No. 25,874, filed Mar. 16, 1987.
Shinbach et al., "Heat Sealing of Semicrystalline Polymers", U.S. Ser. No. 26,051, filed Mar. 16, 1987.
Warner et al., "Surface Modification of Semicrystalline Polymers", U.S. Ser. No. 25,881, filed Mar. 16, 1987.
Ouderkirk et al., "Polymer with Reduced Internal Migration", U.S. Ser. No. 25,844, filed Mar. 16, 1987.
Ouderkirk et al., "Surface Modification of Semicrystalline Polymers", U.S. Ser. No. 25,845, filed Mar. 16, 1987.

*Primary Examiner*—Michael W. Ball
*Assistant Examiner*—Jeff H. Aftergut
*Attorney, Agent, or Firm*—Gary L. Griswold; Walter N. Kirn; Mark A. Litman

[57] ABSTRACT

Semicrystalline polymers can have predetermined amounts of their surfaces rendered quasi-amorphous by irradiation. Polymer surfaces which are so modified can display enhanced ability to accept bonding to other materials, particularly adhesives.

32 Claims, No Drawings

ADHESIVE BONDING TO QUASI-AMORPHOUS POLYMER SURFACES

This application is a continuation of U.S. Ser. No. 025,847, filed Mar. 16, 1987, now abandoned.

BACKGROUND OF THE INVENTION

1. Field of the Invention

The present invention relates to a process for adhering articles comprising adhesives on semicrystalline polymeric materials and particularly on semicrystalline poly(vinyl chloride) polymeric materials having a quasi-amorphous surface region or surface layer of the same or similar polymeric material. The novel article is also described.

2. Background of the Art

The effects of actinic radiation on the degradation of polymer surfaces have been studied for many years. Prior to about 1970, this work was done with low intensity photolamps at wavelengths greater than 220 nanometers (nm). Numerous papers are available in the literature, typical of which are Day and Wiles, *Journal of Applied Polymer Science*, 16 175 (1972), and Blais, Day and Wiles, *Journal of Applied Polymer Science*, 17 p. 1895 (1973).

Between 1970 and 1980 the effects on polymer surfaces of ultra-violet (UV) lamps with wavelengths less than 220 nm were studied for lithography and surface modification purposes. Such studies are exemplified by Mimura et.al., *Japanese Journal of Applied Physics*, 17 541 (1978). This work illustrates that long exposure times and high energies are required to cause photoetching when UV lamps are used. U S. Patent No. 3,978,341 (Hoell) teaches an apparatus for exposing polymeric contact lenses to a spark discharge producing 83 nm to 133.5 nm U.V. radiation to improve the wettability and adhesiveness of the lenses.

In 1975 the excimer laser was discovered. An excimer laser is an excited dimer laser where two normally non-reactive gases (for example Krypton, Kr, and Fluorine, $F_2$) are exposed to an electrical discharge. One of the gases (Kr) is energized into an excited state (Kr*) in which it can combine with the other gas ($F_2$) to form an excited compound (KrF*). This compound gives off a photon and drops to an unexcited state which, being unstable, immediately disassociates to the original gases (Kr and $F_2$) and the process is repeated. The released photon is the laser output. The uniqueness of the excimer laser is its high efficiency in producing short wavelength (UV) light and its short pulse widths. These attributes make the excimer laser useful for industrial applications. Kawamura et.al., *Applied Physics Letters*, 40 374 (1982) reported the use of a KrF excimer laser at 248 nm wavelengths to photo-etch polymethyl methacrylate (PMMA), a polymer used in preparing photolithography resists for semiconductor fabrication.

U.S. Pat. No. 4,414,059 (Blum, Brown and Srinivasan) disclosed a technique for the manufacture of microelectronic devices utilizing ablative photodecomposition of lithography resist amorphous polymers at wavelengths less than 220 nm and power densities sufficient to cause polymer chain fragmentation and immediate escape of the fragmented portions. The photodecomposition leaves an etched surface. The authors found that using an ArF excimer laser at 193 nm and with a 12 nanosecond pulse width, a threshold for ablatively photo decomposing poly(methylmethacrylate) resist material occurs at about a fluence of 1--12 $mJ/cm^2/pulse$. It is stated that large amounts of energy, greater than the threshold amount, must be applied before ablation will occur. The energy used must be 1) sufficiently great and 2) applied in a very short amount of time to produce ablative photodecomposition.

U.S. Pat. No. 4,417,948 (Mayne-Banton and Srinivasan) and a related publication, Srinivasan and Leigh, *Journal American Chemical Society*, 104 6784 (1982) teach a method of UV photo etching poly(ethylene terephthalate) (PET). In these publications the authors indicate the mechanism of photo etching to be one of chain scission or bond breaking of surface polymer molecules by the high energy UV. Bond breaking continues in the presence of irradiation and the smaller units continue to absorb radiation and break into still smaller units until the end products vaporize and carry away any excess photon energy. This process results in small particles being ablated away, and various gases being evolved. The remaining surface material comprises molecules of low molecular weight (oligomers). Examining the PET repeating unit and the author's claim of bond scission, it is believed that the following occurs:

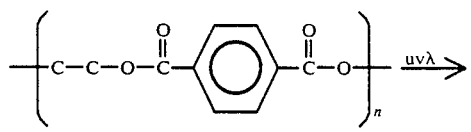

CO, $CO_2$, plus mixture of simple organic compounds and low molecular weight oligomers Indeed, in the *Journal of the American Chemical Society* article, the authors analyze for benzene and start detecting it at about the threshold for photodecomposition for PET; i.e., about 20$mJ/cm^2$/pulse at 193 nm. The authors also indicate that the photo etch process is accelerated in the presence of oxygen which seals the ends of the broken chain'fragments and prevents recombination of these fragments.

Srinivasan, *Journal of the Vacuum Society*, Bl, 923 (1983) reports the results of ablative photodecomposition of organic polymers through a 0.048 cm diameter mask and states that a threshold exists for the onset of ablation and, for PMMA, that the threshold is 10$mJ/cm^2$/pulse. He then goes on to state that one pulse at 16$mJ/cm^2$gave an etch mark on PMMA while 50 pulses at 4$mJ/cm^2$/pulse left no detectable etch marks. For PET and polyimide, the threshold began at about 30$mJ/cm^2$/pulse. However, for a satisfactory etch pattern the optimum fluence ranged from 100 to 350$mJ/cm^2$/pulse.

In Srinivasan and Lazare, *Polymer*, 26, 1297 (1985) Conference Issue, the authors report the photo etching of 6 ×12 mm samples of PET, PMMA and polyimide polymers with both continuous radiation at 185 nm from UV lamps and pulsed radiation at 193 nm from an excimer laser. The use of continuous low energy UV lamps causes photo oxidation of the polymer surface with a resultant increased oxygen to carbon ratio (O/C ratio) as determined by x-ray photoelectron spectroscopy (XPS) equipment, while the use of a pulsed high energy excimer laser, which produces chain scission in and ablation of the polymer surface, resulted in a lower O/C ratio as determined by XPS. The authors then go on to say "It may be pointed out that ablative photo decomposition is not exactly a method for the modification of a polymer surface at an atomic level since it totally eliminates the atoms at the surface and creates a fresh surface."

U.S. Pat. No. 3,607,354 discloses the use of highly active hydroxybenzene solvents to delustre the surface of an oriented polyethylene terephthalate film. The solvent acts to dissolve and swell the PET and remains in the surface layer. The chemical composition of the surface layer is different from that of the bulk polymer because of the presence of the very active solvents and the apparent formation of large spherulitic crystallites that tend to interfere with light transmission and contribute to the delustering.

U.S. Pat No. 4,568,632 (Blum, Holloway and Srinivasan) claims a method for photo etching polyimides. The process described uses a pulsed excimer laser at 193 nm. The stated incident energy required for photo ablation is much higher for polyimide than for PET. The value for the laser fluence threshold of PET was reported as about 30 $mJ/cm^2$/pulse while for polyimide it was reported as about 50 $mJ/cm^2$/pulse. An operative level was noted as about 50-100 $mJ/cm^2$/pulse for PET and 100-300 $mJ/cm^2$/pulse for polyimide. The etch rate found for PET was 1000 Angstroms for a fluence of 100-300 $mJ/cm^2$/pulse and for the polyimide was 750 Angstroms for 350 $mJ/cm^2$/pulse.

Lazare and Srinivasan, *Journal Physical Chemistry*, 90, 2124 (1986) report on the study of surface properties of PET which have been modified by either pulsed UV laser radiation or continuous UV lamp radiation. The authors report on the high fluence ablation of PET as follows: (1) the PET irradiated surface is a layer of low molecular weight material, (2) the surface has a rough chemically homogeneous texture, (3) the surface has a high chemical reactivity characteristic of oligomers, and (4) the surface could be removed by washing in acetone. Since extremely low molecular weight fragments (oligomers) of PET are soluble in acetone, the authors assert this removal of the treated surface is indicative of the presence of low molecular weight material on the surface. The authors also report that the low intensity UV lamp treated PET surfaces would not wash off with acetone. This later article reports thresholds for ablation of PET at about 30-40 $mJ/cm^2$/pulse.

Japanese Patent Publications JA 59-82380, JA 59-101937 and JA 59-101938 (Kitamura, Veno and Nomura) describe the treatment of various polymers with many pulses from moderately high energy lasers for the purpose of increasing adhesion and forming a barrier layer to prevent plasticizer migration from within certain polymers.

Bishop and Dyer, *Applied Physics Letters*, 47, 1229 (1985) extended the photoablation etching work of others to actually cutting through or slitting the polymer film by increasing the energy density of the laser beam by concentrating it at the film surface.

The authors of the above references were studying the photodecomposition or photoablation process of UV radiation on polymer surfaces, without regard to whether the polymer was semi-crystalline or amorphous. The present invention does not produce substantial photodecomposition and little or no photoablation, and is concerned only with semicrystalline polymer surfaces produced by exposure to an energy regime different from those used in the prior art.

"Polymer Interface and Adhesion", Souheng Wu, Published by Marcel Dekker, Inc., N.Y. and Basel, Chapter 5, page 206 indicates that when a polymer melt cools and solidifies, an amorphous surface is usually formed, although its bulk phase may be semicrystalline. This is at least in part a result of the presence of fractions or materials which are not readily accommodated in the crystalline structure being rejected to the surface. This amorphous surface is believed to be extremely thin, corresponding to only a few layers of molecules, and is of the order of no more than 2 or 3 nm, and is generally less than 2 nm in thickness.

U.K. Patent No. 1,579,002 discloses vacuum glow discharge treatment of polymeric surfaces to increase adhesion to that surface. The glow discharge (i.e., corona type discharge) in the vacuum reduces the yellowing typically resulting from corona discharge treatment by 75 to 80%. The surfaces are heated to a temperature below the glass transition temperature or melting point during glow discharge treatment.

U.S. Pat. No. 3,081,485 describes a process for heating and softening polymeric materials using e-beam irradiation so that further mechanical treatment such as stretching and coating can be carried out. The energy densities used (e.g., column 2, line 15) are about two orders of magnitude higher than the energy densities used in the present invention. The energy levels described in U.S. Pat. No. 3,081,485 would cause ablation. The authors note on column 2, lines 26 ff. that small traces of irradiated material are evaporated during irradiation. Although the patent describes surface heating, the immediate depth of e-beam penetration (see column 3) appears to be greater than 150 microns. This form of energy would have equal effects on the bulk polymer and would not cause only surface modifications.

U.S. Pat. No. 4,631,155 describes the surface modification of polymers by subjecting the surface to at least one pulse of intense electromagnetic radiation. The surface polymer is disoriented during the relatively long exposure to radiation. Disorientation is indicative of an amorphous surface. Very thick amorphous layers appear to be formed as indicated by the chloroform test described in column 5.

SUMMARY OF THE INVENTION

The present invention provides an amorphized surface layer or surface region on semicrystalline polymers and an adhesive on such a surface. Some of the special properties in semicrystalline polymers useful in this invention are reduced optical reflectance and increased optical transmission, increased coating adhesion, increased auto-adhesion, a non-yellowed (non-degraded) surface, and a non-textured (non-ablated) surface. The polymeric article used in the process of the present invention comprises a semicrystalline polymer having on at least one surface thereof areas having a depth of at least 5 nm of the same polymer composition in a quasi-amorphous state and an adhesive, preferably a pressure-sensitive adhesive, on said at least one surface. The areas may be continuous or discontinuous.

DETAILED DESCRIPTION OF THE INVENTION

The present invention provides a unique amorphized surface layer or surface region on a semicrystalline polymer, formed by the irradiation of the polymer by radiation which is strongly absorbed by the polymer and of sufficient intensity and fluence to cause such amorphized layer. An adhesive material is bonded to said layer or to an organic polymer layer bonded to said amorphized layer as a plasticizer barrier layer, for example. The semicrystalline polymer surface has been altered into a new composition of matter by actinic radiation such as an intense short pulse UV excimer laser or short pulse duration, high intensity UV flashlamp. This surface exhibits improved ply adhesion to adhesives, either applied from solvent or by heat lamination, as compared to film surfaces treated by corona discharge or plasma priming.

The surfaces useful in the practice of the present invention all include quasi-amorphous regions. In a preferred embodiment this region begins at the surface and comprises the entire top surface or region (if discontinuous). In other useful embodiments the quasi-amorphous region may lie immediately below or be part of a highly textured or chemically modified structure as would be produced according to the ablative procedure disclosed in U.S. Pat. No. 4,417,948, "Modification of Polymer Surfaces by Far ultraviolet Radiation of Low and High (Laser) Intensities", R. Srinivasan and S. Lazare, *Polymer*, 1985, Vol. 26, Aug pp. 1297–1300; and "Ablative Photodecomposition", R. Srinivasan and W. J. Leigh, *J. Am. Chem Soc.*, 1982, 104 6784–6785. The useful surfaces according to these references can widely vary in their surface characteristics. These surfaces will contain zones or regions of quasi-amorphous polymer under polymeric decomposition debris and/or ablated surface areas. All products of this ablation technique will have significant, measurable amounts of polymer decomposition debris on the surface, in concentrations greater than present in the bulk polymer. This debris may be in the form of carboxyl groups, hydroxyl groups, lower molecular weight polymers or components, and the like. The polymers subjected to a rigorous ablative process as preferred by these references will have a surface with significant microstructuring thereon having average polymer molecular weights the same or less than that of the polymer in the bulk regions, and the surface exhibiting a lower oxygen/carbon ratio than the bulk material. The periodicity between peaks typically averages between 300 and 400 nm and the average height (from valley to peak) of the microtexturing features is usually between 200 and 400 nm. These materials, as well as the preferred structures being substantially free of polymer decomposition debris having quasi-amorphous areas which begin at the surface, are included within the description of a layer having a quasi-amorphous area of at least 5 nm in depth.

The residual debris denoted above would be organic material having a lower oxygen/carbon ration than the bulk polymer. Even if not visually observable in the amounts present, the debris itself would be yellower in color than the bulk material and would be more highly conjugated. The debris also tends to leave microscopically observable (at least 10,000, preferably 20,000X) artifacts on the surface recognizable as debris and not merely texturing. With respect to polyethylene terephthalate, ablation produces a surface substantially soluble in acetone, while the preferred quasi-amorphous surface is not in acetone.

In understanding the present invention, a number of terms and concepts should be appreciated. The treatment of the surface of semicrystalline polymeric materials according to the present invention does not add or substantially remove material from the surface. Residual solvent or residual low molecular weight reactants and additives may be volatilized during this treatment, but there is less than 0.1% degradation in the treated polymer volume (to a volatile state) and/or volatilization of the bulk of polymeric material having a molecular weight in excess of 10,000. The chemical modification of the polymer surface (e.g., oxidation, chain breakage) is minimal if there is any at all. Only a small amount of chain breakage occurs, without the generation of significant amounts (i.e., greater than 0.1% by bulk weight) of materials volatilized during the process.

The surface of the semicrystalline polymer is converted into its quasi-amorphous form by heating and rapid cooling of a determined amount of that surface. A determinable depth of the polymer composition is converted to the quasi-amorphous state. The conversion is referred to as "amorphizing." The thickness of the amorphized polymer, as measured from the surface downward into the bulk of the polymer, can be controlled. The polymer usually has a quasi-amorphous top surface having a depth of at least 5 nm, preferably at least 10 nm, more preferably at least 40 nm and most preferably at least 60 nm. The range of thickness for the quasi-amorphous phase or surface of the polymer may be from about 5 to 10,000 nm, preferably 10 to 1,000 nm, more preferably 20 to 500 nm or 20 to 100 nm and most preferably 20 to 250 nm, depending upon the ultimate use of the article.

The terms amorphous, crystalline, semicrystalline, and orientation are commonly used in the description of polymeric materials. The true amorphous state is considered to be a randomly tangled mass of polymer chains. The X-ray diffraction pattern of an amorphous polymer is a diffuse halo indicative of no regularity of the polymer structure. Amorphous polymers show softening behavior at the glass transition temperature, but no true melt or first order transition.

The semicrystalline state of polymers is one in which long segments of the polymer chains appear in both amorphous and crystalline states or phases. THe crystalline phase comprises multiple lattices in which the polymer chain assumes a chain-folded conformation in which there is a highly ordered registry in adjacent folds of the various chemical moieties of which the chain is constructed. The packing arrangement (short order orientation) within the lattice is highly regular in both its chemical and geometric aspects. Semicrystalline polymers show characteristic melting points, above which the crystalline lattices become disordered and rapidly lose their identity. The X-ray diffraction pattern of semicrystalline polymers (or copolymers) generally is distinguished by either concentric rings or a symmetrical array of spots, which are indicative of the nature of the crystalline order.

Orientation of the polymer is the directional alignment of the polymer chain (long-range order) or segments of the polymer (chain) within the polymer composition. In the quasi-amorphous state described in the practice of the present invention, it appears that the overall long order orientation or ordering of the crystal lattice remains in an apparent crystalline orientation. It also appears that there is, however, significant localized disordering along the chain (short-range order orientation). The quasi-amorphous form thus exhibits short-range order non-orientation or low orientation typical of amorphous phases while it exhibits long-range ordering typical of crystalline structures. These characteristics are observable and determinable by single analytic techniques or combinations of techniques such as X-ray diffractions, spectromicrophotometry, IRRAS, NMR, solvent extraction, and the like.

The surface quasi-amorphous layer is firmly adhered to the bulk of the semicrystalline polymer because of the in situ nature of the conversion. There can even be a discernible gradation zone between the quasi-amorphous and semicrystalline areas, although this is not always the case. That is, the transition can be very abrupt within the polymer.

The portion of the surface area which is amorphized may be as small as 1% with some beneficial effects being noted. Generally it is at least 3%, and preferably 5 to 100% of the surface. More preferably at least 10, 50 or 80 to 100% of the surface is quasi-amorphous. These are percentages by surface area.

In performing the process of making the quasi-amorphous surfaces of the present invention, the wavelength of the ultraviolet radiation and/or the polymer and/or absorbing dye in the polymer should be chosen so that the polymer composition exhibits an extinction coefficient greater than about 5,000. The higher the extinction coefficient for any given wavelength, the thinner is the surface layer which resides in the optical path of the radiation, and correspondingly, the thinner is the surface layer which undergoes a morphological transition or "amorphization". The wavelength range of preferred interest is between about 180 and 260 nm, with the highest extinction coefficient being manifested at the shorter wavelengths. Preferably a coefficient of extinction of at least 10,000 is exhibited by the polymer at the wavelength of irradiation.

When utilizing ultraviolet radiation (e.g., 193 nm), it is desired that the polyester film receives energy corresponding to a fluence of 3–25 mJ/cm$^2$/pulse. At fluences of less than 3 mJ/cm$^2$/pulse, the effect of the radiation is not readily discerned. At fluences greater than 25 mJ/cm$^2$/pulse, one begins to encounter excessive damage to the affected surface layer, such as vaporization (e.g., off-gassing) of low molecular weight products of photodegradation, substantial reduction of the molecular weight of the surface layer, and more extensive surface roughening.

The radiation pulse duration, i.e., the pulse width, should be in the range of 10 nanoseconds to 100 microseconds to assure rapid excitation of the affected surface layer. Longer pulse widths tend to be used with lower energy pulses and/or lower coefficients of extinction to produce the appropriate mechanistic events in the formation of the quasi-amorphous regions.

The net effects of pulse width, coefficient of extinction, and radiation intensity are to produce a particular type of mechanistic events. First, and to a minor degree, there is a photolytic effect in which absorbed radiation energy causes random bond scission to occur in the semicrystalline polymer. This effect is desirably minimized in the practice of the present invention to minimize the damage to polymer properties caused by this effect. Indeed, operation of the present invention under ideal conditions has been found to cause some decrease in the oxygen-to-carbon ratio, but sensitive ellipsometric and gravimetric measurements have been unable to detect any significant loss of material as a result of proper radiation conditions. However, the surface layer can undergo some controlled degree of degradation as reflected in less than about a 50% reduction in the number average molecular weight.

The second effect is a result of the unusual nature of the thermal excitation of the surface layer in the optical path of the radiation. Much of the absorbed light energy is translated into heat, with the heating cycle corresponding to the pulse width of the radiation. It is certain that instantaneous temperatures that far exceed the normal melting point of the polymer (e.g., for polyethylene terephthalate that is about 260° C.) are reached throughout most of the affected volume, although an unusual thermal gradient may be produced in that area because of the rapid attenuation of the incident energy due to light extinction by the polymer composition. The heat cycle thus corresponds to the pulse width, in a range of from about 10 nanoseconds to 100 microseconds. After the heating cycle, the next phenomic concern is the ensuing cooling cycle. Because of the thin nature of the affected volume and its contact with ambient air at the surface and bulk material (which are usually at room temperature), it can be estimated that the surface probably cools down to the glass transition temperature (e.g., for polyethylene terephthalate this is about 75° C.) within microseconds. Once below this temper polymer chain conformations tend to be frozen. Considerations with respect to this unusually brief thermal cycle indicate that conformational changes available to the polymer chains remain highly restricted during the brief period while the affected surface area undergoes this excitation. Short segmental motions, e.g., of the 'crankshaft' rotational type, have extremely short relaxation times, and it is expected that they may readily occur within the time-temperature regime created in the practice of the process of the present invention. The confirmation that such motions do indeed occur is provided by the IRRAS spectroscopic studies that show that there is a significant trans- to gauche-confromer transformation in the surface layer which results from the irradiation of semicrystalline film (e.g., biaxially oriented poly(ethylene terephthalate)) with an ArF excimer laser.

This type of conformational change requires the rotation of a short segment of the PET chain involving only a few carbon or oxygen atoms. Similar considerations indicate that it is highly unlikely that the pre-existing crystallites or crystal lattices in the affected surface layer undergo any major spatial rearrangements because this time-temperature regime precludes the type of long range transactional and large chain segment rotational motions which would materially change the pre-existing packing arrangement within the crystal lattice. Thus, it strongly appears that the pulsed UV irradiation of PET (and probably all semicrystalline polymers having appropriate extinction coefficients) provides films having surface layers with a unique morphology in which the polymer chains are highly disordered over short segment lengths, but substantially retain the long-range order that existed between chains and over long segment lengths of those chains prior to excitation. Indeed, the laser treatment of a thin film of thermally crystallized PET indicated that the spherulitic structure remained intact, tending to affirm this description.

The substantial trans-to-gauche conformed transformation is a clear indication of short range chain conformation disordering, suggesting that although the crystallites may have undergone short range disordering, the longer range 3-dimensional packing under probably remains virtually intact. It is for this reason that the surface is referred to as quasi-amorphous since it has physical characteristics embodying some crystalline properties, and yet displays predominantly amorphous properties.

The volumes of polymer affected or converted by the process of the present invention (the radiation effected surface layer) is defined as being in a 'quasi-amorphous' state because the highly ordered registry of identical chemical moieties in adjacent folds of the chain-folded crystal lattice is largely destroyed, but the overall 3-dimensional architecture of the crystal lattice is preserved. Thus, the chemical disordering which occurs as a result of the radiation is characteristic of an amorphous state, while the retention of longer range geometric order resembles a pseudo-crystalline state. The layers or regions are neither totally amorphous nor totally crystalline in the classic sense of those words. In this specification where quasi-amorphous layers or regions produced in the practice of the present invention are discussed, those regions may be referred to as quasi-amorphous layers or regions because their chemical properties tend to resemble amorphous compositions rather than crystalline compositions, but amorphous and quasi-amorphous are distinctly different as noted in the description of quasi-amorphous materials given above.

Quasi-amorphous is a state which is between semicrystalline and amorphous. It is more difficult to distinguish from a true amorphous state than a semicrystalline state, but a clear distinction can be drawn.

The quasi-amorphous layer must, of course, be formed from a semicrystalline state. The semicrystalline state may be a uniaxially oriented film, biaxially oriented film, or contain grossly unoriented crystallites (e.g., spherulitic crystallites randomly distributed throughout the film). When such a semicrystalline film is converted by the process of this invention (in whole or in part, as on one surface only) to the quasi-amorphous form, the quasi-amorphous areas will appear to be amorphous except that they will retain a latent memory for the crystallite orientation This is a definitive distinction from the true amorphous state.

For example, oriented film will display anisotropy with respect to the absorption of infrared radiation (e.g. between 5,000 and 16,000 nm) in various directions in the film. Biaxially oriented film would most significantly display this anisotropy between the unoriented thickness dimension (e.g., the Z-axis) and the oriented length and width dimensions (e.g., the X- and Y-axes) of the film. When such an oriented film is quasi-amorphized according to the present invention to a state most closely resembling a true amorphous film (e.g., the entire thickness or a larger thickness is repeatedly treated without ablation of the film is quasi-amorphous), the film or layer will appear to be amorphous. However, the film or layer will not be truly amorphous because it will retain a latent memory for the crystallite orientation, in this case being evidenced by a latent memory for the anisotropic orientation of the original semicrystalline polymer.

When this quasi-amorphous layer or film is heated to promote recrystallization, the film or layer will begin to regain its original crystallite distribution or in the case of oriented film, regain at least part of its anisotropic orientation. When a truly amorphous layer is reheated, it will not develop anisotropy. Where the semicrystalline polymer film originally contained grossly unoriented crystallites, reheating of the quasi-amorphous layer or film would return such a crystallite orientation to the layer or film.

The process appears to work by the semicrystalline polymer's absorbing the energy of the irradiation within a limited depth of the irradiated surface. The energy is of sufficient intensity and duration to melt polymer, but of intensitiy and duration to evaporate, significantly chemically modify, or ablate polymer. When the irradiation stops, the melted polymer rapidly cools without recrystallization. No special cooling of the melted layer usually needs to be performed as the melted layer is usually sufficiently thin that ambient air and adjacent bull polymer temperatures will cool it sufficiently rapidly. Forced cooling can be used on thicker layers if desired or can be used on thin layers to insure even more rapid cooling.

The semicrystalline polymer should be able to absorb the irradiation used in the process. The more highly absorptive the polymer is of the radiation, the greater the concentration of the process to the surface of the polymer. In general, the polymer should be able to absorb sufficient energy to cause thermal softening or melting of the surface and yet not absorb radiation at such a high level as would cause ablation, excessive degradation, or volatilization of the polymer. For example, a polymer may absorb at least 5% of incident radiation in a 1 micron thick film when the radiation is applied at a rate of 1 Joule/cm$^2$. Absorption the radiation may be enhanced by the addition of radiation absorbing dyes and pigments to the polymer. These, and other, radiation absorbing materials can have some noticeable effect at levels as low as 0.05% by weight, but can also be used at higher levels, even up to 90% by weight and higher. For example, a polymer used to modify a pigment may be treated after it has been combined with the pigment. A generally preferred range would be from 0.1 to 50% by weight for such radiation absorbing additives.

The quasi-amorphous surface layer on the semicrystalline polymer base is unique because (1) it exists without substantial change of the surface chemical structure while the bulk properties of the polymer are unchanged, (2) it has a lower softening temperature than the semicrystalline polymer, which lower softening temperature allows auto adhesion at a temperature below that at which the bulk film would auto adhere, (3) it is more easily swelled by organic solvents which allows a high degree of bond entanglement with itself and with other coatings and polymers, (4) the controlled depth of amorphization serves to limit the depth of solvent penetration and hence limits the effect of solvents on the quasi-amorphous layer, and (5) it has a reduced optical index of refraction which is graded from the bulk to the surface.

The substrate intermediate product of the present invention has characteristics and features which tend to be different from those of the products of prior art processes. For example, it has been noted that the depth of the quasifor amorphous areas is at least five (5) nanometers. This tends to be an inherent result of the process. The previously referenced work reported by Wu concerning amorphous surfaces generated by non-crystallizable fractions being forced to the surface produces very thin amorphous layers. The thickness of these layers is never more than 3 nm and is usually less than 2 nm. Additionally, the chemical make-up of the surface region is significantly different from that of the bulk polymer because of the concentration of noncrystallizable fractions at the surface. The surface produced by this prior art phenomenon would have a weight average molecular weight more than 50% different from the weight average molecular weight of the associated bulk semi-crystalline polymer. The surface produced by the practice of the present invention would have a difference of less than 50% between the weight average molecular weight of the surface quasi-amorphous layer and the bulk semicrystalline polymer.

Another characteristic of the treated materials of the present invention which sometimes can be observed but is unique to those articles of the present invention is the similarity between the molecular orientation of the surface quasi-amorphous layer and the semicrystalline polymer in bulk. Polymer orientation relates to the degree to which polymer chains are statistically or more predominantly oriented or aligned within the polymer. Ordinarily, when semicrystalline polymers are melted, the orientation in the amorphous condition is randomized and is significantly different from the orientation in the semicrystalline polymer. Observations of the amorphized surfaces in the practice of the present invention indicate that the orientation within the quasi-amorphous layer remains similar to that of the semicrystalline polymer. Microscopic examination under cross-polarizers shows that the orientation of the quasi-amorphous layer is similar to or indistinguishable by visual observation from the orientation of the semi-crystalline polymer. The physical properties of the quasi-amosphous layer, such as its index of refraction, infrared absorption spectrum and solubility clearly show that the layer is in fact in an amorphous-like state.

Corona discharge treatment of polymer surfaces does not necessarily render surfaces amorphous, but oxidizes the surface of the polymer. Corona treatment tends to have its most significant oxidative effect to a depth of about 2 nm. The corona treatment creates or adds functional groups to the polymer as a result of reactions with the environment which the discharging is performed. For example, functional groups such as carboxylic groups, phenol groups, hydroxyl groups, carboxyl groups, and amide groups can be added to the polymer by the corona treatment. These groups would not be a direct product of the process of the present invention. Corona treatment of the amorphous surfaces of the present invention would generate such functional groups and would not necessarily crystallize the surface. Corona treatment also changes the optical density of the surface layer because of the formation of these new chemical materials in that surface. As compared to the bulk polymer, the optical density of the surface layer may increase by 0.2 within a 50 nm region of the visible portion of the electromagnetic spectrum (particularly in the yellow region).

Both corona discharge and flame treatment significantly modify the chemical composition of the polymer in the surface regions treated. Corona discharge tends to decompose or crosslink the polymer, creating a higher crosslink density in the surface than in the bulk polymer. The article of the present invention, unless further treated as by corona discharge, will have approximately the same crosslink density in the amorphous surface layer as in the bulk polymer region. This change in crosslink density can be observed in the surface layer by a reduced tendency or ability to recrystallize. Plasma, and ion implantation treatments have effects on the crosslink density similar to those generated by corona discharge.

Flame treatment of polymeric surfaces (such as that reported in U.S. Pat. No. 4,568,632 is a much more destructive and chemical composition altering process than the process of the present invention. The patent describes the ablation of materials from the surface during treatment. This is probably the combined result of evaporation oxidation, polymer chain breakage, and other destructive processes. This process would cause the formation of the functional groups described above and probably cause a significant overall change in the molecular weight and chemical make-up of the polymer on the surface, probably to a depth of about 2 nm. The flame treatment as presently practiced also causes a change in the optical density of the polymer on the surface due to the change in the chemical composition of that surface layer. That change in optical density is at least about 0.2. In the practice of the present invention, the amorphous layer produced on the surface has an optical density which is within 0.1, preferably within 0.08, more preferably within 0.05 and most preferably within 0.03 units of the bulk polymer. Additional treatment (e.g., corona discharge or coloration with dyes or pigments) could, of course, be used to change that value. But in the absence of dyes or pigments differentially distributed between the amorphous layer and the bulk layer, there should be little or no difference in optical densities.

In the preferred fluence range of the present invention, the most notable result is the formation of a new morphological state of the polymer within the surface layer (i.e., a quasi-amorphous, deoriented or oriented glass) which resides in the optical path of the radiation and begins at the surface of the polymer. This morphological transition is attended by some extremely mild degradation, as attested by the diminution of the O/C ratio (XPS analysis and solvent extraction data). The failure to detect weight loss by gravimetric and ellipsometric measurements indicates that gas evolution is, at most, a minor event. Similarly, IRRAS spectra shows evidence of only a morphological rather than any chemical change. The change in the O/C ratio is quite different from that occurring with flame treatment or corona discharge where the atom/atom, oxygen/carbon ratio increases. This increase may be very small, but in most thorough treatments there is a change in the ratio of about 0.1 or 0.2. The O/C ratio may actually decrease in the quasi-amorphous layer as compared to the bulk polymer.

The remarkable aspects of the surface layer produced in this invention are (1) its unchanged texture; (2) its unchanged optical absorption or scattering characteristics, and (3) its still appreciable molecular weight. Each of these aspects can be very important. For example, film roughness is very injurious in substrates for magnetic media because that roughness can be the limiting factor in the ultimate density of recorded information that can be achieved. Film yellowing or scattering (i.e., haze) on the other hand cannot be tolerated where the film is used as a substrate in the manufacture of imaging products, e.g., X-ray film. Finally, the absence of a major fraction of low molecular weight oligomeric products avoids the situation where subsequently applied functional coatings fail in use due to inherently poor adhesion or solvent resistance which stems from the weak boundary layer present at the coating/film interface.

The quasi-amorphous surface of the polymer also reduces the reflectivity of that surface. Normal, smooth uncoated polymer films will have a reflectivity of 10% or more. Highly texturized polymer surfaces can reduce this reflectivity, but cannot present a smooth surface, that is a surface having no texture which is easily visible with a scanning electron microscope at 10,000x magnification. The polymer films of the present invention can provide smooth surfaces with reflectivities of 9% or less to 550 nm light at 80°-90° incident angles. This is clearly shown is the Examples.

The process of the present invention also tends to not modify the surface of the polymer in a topographic morphologic sense. The surface structure, before and after amorphizing, tends to be the same in the practice or the present invention. Surfaces with a high degree of surface roughness may be somewhat softened in their features, but will still tend to have rough surfaces. Smooth surfaces will be substantially unchanged with respect to the absence of features on their surface. Flame treatment would tend to greatly modify the surface features of the surface so treated.

The process of producing this invention is an advance over prior methods of surface modification such as sputter etch, plasma, corona, chemical, flame and solvents because no vacuum is required, no contact with the surface is required, no chemistry is added to the treated polymer so that it is more likely to be recyclable, and there are no known environmental problems. These other processes, especially corona discharge treatment of the surface, can be used in combination with the materials of the present invention. Corona discharge of the quasi-amorphous surface further improves bonding strength.

Polymers generally can be either semicrystalline or amorphous. These categories are descriptions of the degree of ordering of the polymer molecules. Amorphous polymers consist of randomly ordered molecules. That is, the polymers are of low order or non-ordered and are independently surrounding and intertwined with other molecules. Semicrystalline polymers consist of a mixture of amorphous regions and crystalline regions. The crystalline regions are said to be more ordered and the molecules actually pack in some crystalline-like structures. Some crystalline regions may be more ordered than others. If crystalline regions are heated above the melting temperature of the polymer, the molecules become less ordered or more random. If cooled rapidly, this less ordered feature is "frozen" in place and the resulting polymer is said to be amorphous. If cooled slowly, these molecules can repack to form crystalline regions and the polymer is said to be semicrystalline. Some polymers are always amorphous. Some polymers can be made semicrystalline by heat treatments, stretching or orienting and by solvent inducement, and the degree of crystallinity can be controlled by these processes.

One aspect of the uniqueness of the present invention is the reversal of the above crystallization process to transform a thin surface layer of semicrystalline polymer into an quasi-amorphous thin surface layer residing on nonaffected bulk semicrystalline polymer.

There are two necessary conditions required of the radiation source to provide the treatment of the present invention. Both high intensity (high power per unit area) and high fluence (high energy density per pulse) are required of the radiation source. These requirements assure that a substantial amount of heat generated in the very thin surface of treatment stays in the surface The effect of the radiation is to concentrate energy into the surface layer. Thermal diffusion into the bulk reduces this concentration of energy and makes the process less efficient. It is, therefore, desirable that only a small amount of heat be dissipated into the bulk of the polymer during irradiation. The more heat that is transferred to the bulk during the surface irradiation, the less efficient the process becomes until so much heat goes to the bulk that the process no longer works. Because of this requirement to rapidly heat only the surface layer and not the bulk of the polymer, conventional high intensity UV sources such as mercury arc lamps and common Xenon flash lamps with their inherently long pulse widths result in rapid diffusion of the thermal energy into the bulk polymer. This prevents a high concentration of energy being achieved at the surface.

The UV excimer laser is capable of producing high intensity, high fluence radiation on the surface of the polymer to be treated. The polymer used with a UV excimer laser must be semicrystalline and UV absorbing at the UV laser wavelengths. The result of the laser pulse interacting with the surface is a combination of photolyzation and heating. In other words, the short intense pulse significantly heats the surface of the polymer, but not the bulk, above the polymer melting temperature, and some surface molecule chain scission occurs. During the brief time the surface region is heated above its melting temperature, the molecules can randomize themselves into a disordered condition and broken bonds reconnect, although not necessarily to the same end from which they were broken or to the same degree. The temporarily broken molecular bonds will assist this melting process. After irradiation the surface layer will rapidly cool, and "freeze" the new disordered layer into a quasi-amorphous structure. That is, the cooling rate is fast enough so the surface layer cannot recrystallize. The irradiation thus produces a quasi-amorphous layer on the bulk polymer which layer undergoes only a small change in molecular weight because of the recombination of bond scissions and no chemical changes such as the addition of ions. The surface texture undergoes no significant change because no material has been removed or ablated and both melting and cooling occur over a short period of time.

The laser treated surface can be shown to be quasi-amorphous by a number of tests: (1) it washes off with solvents that only the amorphous form of the polymer is soluble in, (2) infrared reflection absorption spectroscopy (IRRAS) of the surface indicates the same pattern is the surface layer as is normally exhibited by the amorphous form of the polymer, and (3) thin film ellipsometry of the surface gives the same refractive index as does the amorphous form of the polymer.

XPS measurements of the treated surface indicates no significant chemical changes by addition. It also shows that a small O/C ratio change has occurred which indicates some small amount of surface decarboxylation. Gel permeation chromatography (GPC) shows only a small molecular weight decrease as compared to the untreated polymer. Water contact angle measurements show no change in the treated surface which means the surface has not been roughened added. There is a slight texturing on an extremely fine scale. Shadow mask Transmission Electron Microscop, (TEM) indicates peaks and valleys on the surface of about 300 Å. This may account for the improved slip properties of the treated surfaces of this invention.

Early investigations of laser treatments of polymers were concerned with etching or ablation of the polymer and thus used laser intensites and fluences much higher than required for the present invention. These investigators found a fluence threshold for ablation which of course was different for each polymer treated. Below this threshold no ablation would take place. Investigation was never made to determine what actually was occurring at lower fluencs It has been found that like the fluence threshold for ablation, there is likewise a fluence threshold for the amorphization of this invention and it too varies with the polymer being treated Because of its great commercial interest, the treatment of PET has been studied most extensively during the progress of the present invention. However, other polymers have also been studied. The following semicrystalline, UV absorbing polymers or copolymers thereof have been treated: polyesters (e.g., PET), nylon, urethanes, coating mixtures of poly(vinylidene chloride) on PET and poly(vinyl chloride) with UV absorbing plasticizer added. Polypropylene, polyethylene (e.g., polyolefins), polyvinyl chloride, polytetrafluoroethylene and polyvinylidene chloride although semicrystalline, are not UV absorbing at wavelengths greater than 190 nm, and therefore, require one of the following: the addition of UV absorbing compounds, shorter wavelength lasers, or an energy source different than a UV laser. E-beam, x-rays, ion beams, and plasmas, if applied in sufficient intensity and fluence can work on these polymers.

Polymethylmethacrylate, epoxies and polyimides are already amorphous and so treatment is unnecessary and does not effect a differentiation between the surface and bulk polymer.

The UV radiation source can be by excimer laser or flashlamps at wavelengths less than 320 nm. The pulse widths should be less than 100 microseconds. Typical pulse widths are 7.5 microseconds for flash lamps and 10-80 nanoseconds for an excimer laser.

The final product of the present invention may be made in a number of different ways. The adhesive may be directly coated onto the quasi-amorphous surface or coated onto a release layer and the quasi-amorphous surface laminated thereto. A second organic polymeric layer, preferably less penetrable to migratory components within the semicrystalline polymer layer (such as UV absorbers, plasticizers, antistatic agents, dyes, and the like) than the semicrystalline line polymer, may be coated over said quasi-amorphous layer and the adhesive coated over that second layer. Alternatively the adhesive may be coated onto a release layer or carrier sheet, the second organic polymer layer coated or laminated to the adhesive and the quasi-amorphous layer laminated to the second polymer layer.

Pressure-sensitive adhesives are art recognized as a standard class of materials. These are adhesives which in dry (substantially solvent free except for residual solvent) form are aggressively and permanently tacky at room temperature (e.g., 15° to 25° C.) and firmly adhere to a variety of dissimilar surfaces upon mere contact without the need for more than manual pressure. They require no activation by water, solvent or heat in order to exert a strong adhesive holding force towards such materials as paper, cellophane, glass, wood and metals. They have a sufficiently cohesive holding and elastic nature so that, despite their aggressive tackiness, they can be handled with the fingers and removed from smooth surfaces without leaving a substantial residue (cf. Test Methods for Pressure-Sensitive Tapes, 6th Ed., Pressure Sensitive Tape Council, 1953). Pressure-sensitive adhesives and tapes are well known, and the wide range and balance of properties desired in such adhesives has been well analyzed (cf. U.S. Pat. No. 4,374,883; and "Pressure-Sensitive Adhesives" in *Treatise on Adhesion and Adhesives* Vol. 2, "Materials", R.I. Patrick, Ed., Marcel Dekker, Inc., N.Y., 1969). The various materials and compositions useful as pressure-sensitive adhesives are available commercially and are thoroughly discussed in the literature (e.g., Houwink and Salomon, *Adhesion and Adhesives*, Elsevier Publ. Co., Amsterdam, Netherlands, 1967; Handbook of Pressure-Sensitive Adhesive Technology, Donates Satas, Ed., VanNostrand Reinhold Co., N.Y., 1982).

Pressure-sensitive adhesives are generally chemically composed of rubber-resin materials, acrylic resins, polyurethane resins, silicone resins, and the like. Amongst the various patent literature describing compositions and improvements in pressure-sensitive adhesive formulations are U.S. Reissue Pat. No. 24,906; U.S. 2,652,351; U.S 3,740,366; U.S. 3,299,010; U.S 3,770,708; U.S. 3,701,758; U.S. 3,922,464; U.S. 3,931,087; U.S. 4,012,560; U.S. 4,077,926; U.S. 4,387,172; U.S. 4,418,120; U.S. 4,629,663; and the like. These classes of rubber resin, acrylic, silicone, and polyurethane pressure-sensitive adhesives as well as any other pressure-sensitive, thermally-activatable, solvent-activatable, or water-activable adhesives are generally useful in the present invention.

EXAMPLES

In the following examples all treatments were done using either a Model 2460 laser by Questek, Billerica, MA or a Model 102E laser by Lambda Physik of Acton, MA. These lasers give equivalent outputs for the purposes of reacting polymer films. The lasers were operated with either Ar plus Fluorine gas at an emission wavelength of 193 nm or with Krypton plus Fluorine gas at an emission wavelength of 248 nm and with a system of cylindrical lenses to control the exposed area of the sample and thus the energy density of the beam striking the sample. Each system was calibrated using a Model ED500 power meter by Gentech, Ste-Fog, Qc, Canada. Pulse width was approximately 15 nanoseconds for both lasers.

EXAMPLE 1

This example describes the treatment of a surface of 0.1 mm (4 mil) thick biaxially oriented polyethylenetere (PET) film with no slip agents added. This film is available as product #OR8478400 obtainable from 3M, St. Paul, Minn. After laser exposure each sample was measured for change in optical transmission at 550 nm using a Lambda 9 Spectrophotometer from Perkin Elmer (Norwalk, Conn.) with a 10 second response time. Untreated film was used as a control and measured 88.25% optical transmission. The following data shown the change in % transmission from this control value.

Table 1 shows the results and indicates an increase in optical transmission for PET films treated on one side at 193 nm and an apparent leveling off of the effect with increased fluence. This increasing and then leveling off is due to the depth of treatment increasing with increasing fluence. Also quite noticeable is the threshold effect wherein about 3 mJ/cm$^2$/pulse fluence is required for the onset of this increased transmission. This fluence threshold is noticed on all effects measured for this laser treatment.

TABLE 1

| Sample | Exposure (mJ/cm$^2$) | % Change in Transmissiom (at 550 nm) |
|---|---|---|
| A | 1 | 0 |

TABLE 1-continued

| Sample | Exposure (mJ/cm$^2$) | % Change in Transmissiom (at 550 nm) |
|---|---|---|
| B | 2 | 0 |
| C | 3 | .03 |
| D | 3 | .08 |
| E | 3 | .10 |
| F | 4 | .18 |
| G | 4 | .37 |
| H | 4 | .45 |
| I | 5 | .58 |
| J | 5 | .78 |
| K | 5 | .82 |
| L | 6 | 1.1 |
| M | 7 | 1.4 |
| N | 8 | 1.28 |
| O | 9 | 1.40 |
| P | 9 | 1.44 |
| Q | 10 | 1.38 |

Laser treatment of polymer films does not significantly change the absorptivity of the film at wavelengths greater than 350 nm. Therefore, increased transmission of laser treated films is a result of reduced reflectivity of the film and measurement of either effect is equivalent.

EXAMPLE 2

The example is a repeat of Example 1 with the exception that the laser gas was a mixture of Kr and F and the output wavelength was 248 nm.

The data indicated that there was no change in the optical transmission until fluence exceeded 5mJ/cm$^2$. There was an increase of transmission to a peak change of 1.5%, reached at 9mJ/cm$^2$. The shift of the fluence threshold to a higher value of about 5mJ/cm$^2$/pulse (as compared to Example (1) which indicates a threshold dependence on the wavelength of the radiation used to treat the surface. This occurs because PET more efficiently absorbs 193 nm wavelength radiation than it does 248 nm wavelength radiation.

Excimer lasers operate efficiently at four different wavelengths: 193, 248, 308, and 351 nm. Efficient modification of the polymer requires that most of the UV radiation be absorbed in the first few tenths of a micrometer of the surface. PET intensely absorbs both 193 and 248 nm. The efficiency of the surface modification also depends on the photolytic activity of the UV. Since 193 nm is more strongly absorbed than 248 nm and has higher photolytic activity, 193 nm radiation is slightly more efficient for surface modification. The threshold for surface modification of PET by excimer laser radiation (15 nanosecond pulse width) is 3 to 4 mJ/cm$^2$/pulse for 193 nm and 5mJ/cm$^2$/pulse for 248 nm.

Excimer lasers produce roughly twice as much power at 248 nm than 193 nm. Since the threshold for surface modification at 248 nm is almost twice that of 193 nm, the net efficiency of surface modification between the two wavelengths is nearly equal. Therefore, the choice of the operating wavelength can be based on other factors.

EXAMPLE 3

Samples of 0.1 mm (4 mil) PET as in Example 1 were treated with one 7.5 microsecond pulse from an L-2695 flashlamp by ILC Technology, Sunnyvale, Calif., with a peak current of 1700 amperes, 25 Joules of stored energy and a lamp to sample distance of 1.0 cm. Optical transmission measurements were made on the treated sample with a Lambda 9 Spectrophotometer and showed an increase in transmission over the measurement range of 340 nm to 700 nm and at 550 nm there was a 1.5% increase. This indicates intense short pulse UV rich flashlamps are also capable of forming amorphous surface on polymers.

EXAMPLE 4

Samples of crystalline polyetheretherketone were treated as in Example 1 at various fluences. Optical reflectivity of the treated samples was measured at 550 nm with a spectrophotometer as in Example 1. The data indicated a reduced reflectivity with increased fluence from 16 to 24mJ/cm$^2$/pulse, from 14.74% reflectivity to 14.60% reflectivity.

The surprising discovery of this invention is that at a certain threshold fluence, in this case 3.5 mJ/cm$^2$/pulse, there is an enormous decrease in energy density required to produce auto adhesion. The explanation of this phenomenon is believed to be that at low fluences, auto adhesion is the result of oxidation of the surface layer, whereas above the threshold fluence an amorphous surface layer is created with a lower softening temperature than the bulk, polymer which results in the increased auto adhesion. It can be seen that in the region of ablation or microtexturing, the auto adhesion for this polymer is also very strong. This is another surprising discovery of this invention and is due to a reduced softening temperature of structures generated on the polymer surface.

EXAMPLE 5

Samples of 0.038 mm (1.5 mil.) Nylon 66 from Allied Corp., Morristown, NJ, Product ID Capran-996 was exposed to one pulse of 25 mJ/cm$^2$ as in Example 1. The samples were bonded to each other using a fiberglass covered hand sealing iron at 143° C. for 6 seconds. Untreated control samples showed no auto adhesion while the exposed samples showed good adhesion by attempting to peel them apart with a 180° hand pull. The samples were boiled in water for 15 minutes and there was little to no perceptible decrease in bond strength.

EXAMPLE

Samples of PET were treated at two pulses at 5 mJ/cm$^2$/pulse as in Example 1. These PET samples were bonded to the treated Nylon 66 samples of Example 5 using the same sealing conditions as Example 5. Peel tests using a 180° hand pull indicated good adhesion between the samples.

EXAMPLE 7

Samples of PET were laser treated as in Example 1 at a fluence of 5mJ/cm$^2$/pulse for 5 pulses and then coated with 0.001 mm (0.05 mil) of series 93 white printing ink from Inmont Corp, Cliffton, N.J. and dried at 180° F. for 24 seconds. Ink adhesion was tested by placing #610 adhesive tape from 3M, St. Paul, Minn. on the razor scribed inked surface and rapidly snap peeling the tape off. The ink on an untreated control sample was easily removed by the tape test but completely remained on the treated samples. A more aggressive adhesive tape, type 622 sold by 3M, St. Paul, Minn. was next used and again the control sample ink coating was removed. The ink on the treated sample coating was not removed and furthermore, the adhesive of the 622 tape remained on the ink coating.

Ink adhesion is directly related to auto adhesion by the increased adherability created by the laser treated amorphous surface layer on the polymer film. Therefore, the threshold fluence effects experienced in autoadhesion is expected to occur also with ink adhesion.

EXAMPLES 8-22

Metallic PVC film (PVC with a metal additive which provides a metallic appearance), white PVC film and transparent PVC film were treated according to the procedures of Example 1 using a 193 nm Ar F excimer laser at 20 mJ/cm$^2$ (2 pulses). At this fluence, the films were irradiated above the threshold energy to allow the surface to become amorphous. These films were laminated to the five different commercially used acrylate pressure-sensitive adhesives. Ply adhesion results are as follows:

TABLE 2

| Precoated Adhesive | Laser Treatment | 90° Peel (lbs/inch) | | |
|---|---|---|---|---|
| | | Metallic PVC | White PVC | Transparent PVC |
| A (Solvent) | Yes | 4.5 | 3.9 | 5.0 |
| A (Solvent) | No | 2.8 | 3.0 | 4.3 |
| B (Melt) | Yes | 3.6 | 3.7 | 4.6 |
| B (Melt) | No | 0.5 | 3.3 | 4.0 |
| C (Solvent) | Yes | 3.0 | 4.5 | 4.8 |
| C (Solvent) | No | 1.3 | 4.4 | 4.0 |
| D (Melt) | Yes | 4.0 | 4.5 | 5.0 |
| D (Melt) | No | 1.0 | 3.5 | 4.5 |
| E (Solvent) | Yes | 3.9 | 4.2 | 5.8 |
| E (Solvent) | No | 2.6 | 3.6 | 5.0 |

The results show that the greatest improvement in ply adhesion was observed on melt adhesives in combination with poly(vinyl chloride) metallic films. The adhesives referred to as melts are pressure-sensitive adhesives known in the art as "polymelts". These adhesives are applied by melt extrusion and remain tacky (i.e., pressure-sensitive) after coating and cooling. The solvent coatings of pressure-sensitive adhesives were solvent cast and dried.

The pressure-sensitive adhesives used in Examples 8-22 are all acrylate pressure-sensitive adhesives and have the following compositions by weight:

| A. | Isoocytylacrylate | 93.0 |
|---|---|---|
| | Acrylic acid | 7.0 |
| | Hydrogenated resin ester (tackifier) | 16.4 |
| | Bis-amide (crosslinking agent) | 3 |
| B. | 2-methylbutylacrylate | 90 |
| | Acrylic acid | 10 |
| | Benzophenone (crosslinking agent) | 0.5 |
| C. | 2-methylbutylacrylate | 90 |
| | Acrylic acid | 10 |
| | Bis-amide (crosslinking agent) | 3 |
| D. | Isoocytylacrylate | 60 |
| | Methacrylate | 32.5 |
| | Acrylic acid | 7.5 |
| | Benzophenone | 0.5 |
| E. | Isoocytylacrylate | 60 |
| | Methacrylate | 32.5 |
| | Acrylic acid | 7.5 |
| | Bis-amide (crosslinking agent) | 3 |

EXAMPLE 23

A coasting of approximately 0.01 nm (0.5 mil) dimethylacrylamide (DMA) was hand spread on the treated surfaces of samples of PET which had been laser treated at a fluence of 12mJ/cm$^2$/pulses and two pulses as in Example 2. These coated samples were then irradiated at 175 KEV with a dose of 0.5 to 10 Mrad in a nitrogen atmosphere with a Model 250 Electrocurtain® electron beam from Energy Science, Inc., Woburn, Mass.

The treated samples were then refluxed for 24 hours in dichloromethane to extract any DMA homopolymer that was not bonded to the PET substrate, and then the reflux solvent was discarded. The samples were then analyzed for the amount of DMA bonded to the PET surface by transmission Fourier Transform Infrared Spectroscopy (FTIR). The analysis results shown in Table 3 are ratios of the peak absorbance of an infrared absorption characteristic of polymerized DMA to that of infrared absorption characteristic attributed to PET. These numbers are indicative of the amount of DMA bonded to the surface of the PET and the higher the number, the more DMA was bonded. Reported results under about 0.4 are not considered significant and due to system noise.

TABLE 3

| Dose (Mrad) | Untreated PET | Laser Treated PET |
|---|---|---|
| 0.5 | 0.00 | 0.14 |
| 1.0 | 0.00 | 0.45 |
| 3.0 | 0.00 | 0.35 |
| 5.0 | 0.42 | 0.87 |
| 10.0 | 1.05 | 2.06 |

This data shows significantly improved bonding of DMA to the laser treated PET above about 5 Mrad.

EXAMPLE 24

A coating of approximately 0.01 mm (0.5 mil) 90/10 mixture of DMA and trimethylol propane triacrylate (TMPTA) was hand spread on the treated surfaces of samples of PET which had been laser treated at a fluence of 12mJ/cm$^2$/pulse and 2 pulses as in Example 2 and further processed exactly as in Example 16 above. The FTIR results are shown in Table 4.

TABLE 4

| Dose (Mrad) | Untreated PET | Laser Treated PET |
|---|---|---|
| 0.5 | 0.02 | 0.40 |
| 1.0 | 0.56 | 0.45 |
| 3.0 | 0.45 | 3.17 |
| 5.0 | 0.19 | 3.53 |
| 10.0 | 0.45 | 2.08 |

This data shows significantly improved bonding of DMA/TMPTA to the laser treated PET above about 3 Mrad.

EXAMPLE 25

Laser Treated Poly(ethylene terephthalate) for Adhesion to Acrylic Thermoplastic Poly(ethylene terephthalate) film of 0.1 mm (4 mil) caliper was treated with a 193 nm UV laser with the following ablative conditions according to the teachings of U S. Pat. No. 4,417,948:

31.4 mJ/cm$^2$/pulse, 25 pulses, 60 degree incidence.

The resulting film was laminated to an adhesive coated silicone release liner. The precoated adhesive on the release liner is a dual layer consisting of a pressure sensitive species of formula isoctylacrylate/acrylic acid (95.5/4.5), and an overcoat layer of thermoplastic resin of formula isoctylacrylacrylate/N-(1,1,3,3-tetramethyl-n- butyl-acrylamide/acrylic acid (50/37/13). The lamination is effected by bringing the primed surface of the PET film into contact with the thermoplastic resin under the following conditions with a commercial film laminator:
Roller speed of 10 inches/min
Roller temperature of 260° F.
Roller nip pressure of 25 lbs/sq inch.

The silicone liner was removed from the resulting laminate, and the exposed pressure sensitive adhesive squeegee-burnished, under ambient conditions, against plate glass. After a one minute dwell time the burnished film is pulled from the glass. The laser treated PET demonstrated no delamination of the adhesive to the glass. This is in contrast to untreated PET which shows total adhesive transfer to glass.

What is claimed is:

1. A process of bonding a polymeric article comprising a semicrystalline polymer having on at least one surface thereof areas having thicknesses of at least 5 nm of the same polymer in a quasi-amorphous state and having an adhesive on said at least one surface, said process comprising contacting said adhesive material to another surface under conditions of heat, pressure or other applied energy sufficient to cause bonding of said adhesive to said another surface.

2. The process of claim 1 wherein said conditions comprise heat and pressure.

3. The process of claim 1 wherein said adhesive comprises a pressure-sensitive adhesive and said conditions comprise pressure.

4. The process of claim 1 wherein at least 1% of said at least one surface is quasi-amorphous and the atom/atom, oxygen/carbon ratio of the amorphous areas is the same or greater than that ratio in the semicrystalline polymer.

5. The process of claim 3 wherein said semi-crystalline polymer is in the form of a layer, sheet, film or coating.

6. The process of claim 3 wherein said areas comprise 80 to 100 percent of said at least one surface and the atom/atom, oxygen/carbon ratio of the quasi-amorphous areas is the same or greater than that ratio in the semicrystalline polymer.

7. The process of claim 5 wherein said areas comprise 90 to 100 percent of said at least one surface.

8. The process of claim 5 wherein the quasi-amorphous area has a thickness of between 20 and 250 nm.

9. The process of claim 3 wherein the quasi-amorphous area has a thickness of between 20 and 100 nm.

10. The process of claim 7 wherein the quasi-amorphous area has a thickness of between 20 and 250 nm.

11. The process of claim 5 wherein said quasi-amorphous area has a thickness in the range of 5 to 10,000 nm and the atom/atom, oxygen/carbon ratio of the quasi-amorphous areas is the same or greater than that ratio in the semicrystalline polymer.

12. The process of claim 5 wherein said quasi-amorphous area has a thickness in the range of 20 to 500 nm and has an optical density, in the absence of dyes or pigments, which differ from that of the semicrystalline polymer by less than 0.1 in the visible region of the electromagnetic spectrum.

13. The process of claim 2 wherein said semicrystalline polymer comprises a polymer selected from the group consisting of poly(vinyl chloride), poly(vinylidene chloride), polytetrafluoroethylene, nylon, polyurethane, polyester, polyolefin, and copolymers thereof having substantially no polymer decomposition debris on said at least one surface.

14. The process of claim 5 wherein said semicrystalline polymer comprises a polymer selected from the group consisting of poly(vinyl chloride), poly(vinylidene chloride), polythetraluorothylene, nylon, polyurethane, polyester, polyolefin, and copolymers thereof.

15. The process of claim 5 wherein said adhesive is an acrylic material.

16. The process of claim 5 wherein said adhesive is an acrylic material and said semicrystalline polymer is poly(vinyl chloride).

17. A process of bonding a polymeric article comprising a semicrystalline polymer having on at least one surface thereof areas having thicknesses of at least 5 nm of the same polymer in a quasi-amorphous state and having an adhesive on said at least one surface, said process comprising contacting said adhesive material to another surface under conditions of heat, pressure or other applied energy sufficient to cause bonding of said adhesive to said another surface, said areas in a quasi-amorphous state having been formed by laser irradiation of said at least one surface which causes a degradation of less than 0.1% in the treated polymer volume, and the optical density of said areas being within 0.1 optical density units of the bult semicrystalline polymer.

18. The process of claim 1 wherein the optical density of said areas are within 0.1 optical density units of the bult semicrystalline polymer.

19. The process of claim 2 wherein the optical density of said areas are within 0.1 optical density units of the bult semicrystalline polymer.

20. The process of claim 3 wherein the optical density of said areas are within 0.1 optical density units of the bult semicrystalline polymer.

21. The process of claim 4 wherein the optical density of said areas are within 0.1 optical density units of the bult semicrystalline polymer.

22. The process of claim 5 wherein the optical density of said areas are within 0.1 optical density units of the bult semicrystalline polymer.

23. The process of claim 6 wherein the optical density of said areas are within 0.1 optical density units of the bult semicrystalline polymer.

24. A process of bonding a polymeric article comprising a semicrystalline polymer having a crystallite orientation, said polymer having on at least one surface thereof areas having thicknesses of at least 5 nm of the same polymer in a quasi-amorphous state which when heated would return said areas to the same crystalline orientation of said semicrystalline polymer and said polymer having an adhesive on said at least one surface, said process comprising contacting said adhesive material to another surface under conditions of heat, pressure or other applied energy sufficient to cause bonding of said adhesive to said another surface.

25. The process of claim 24 wherein at least 1% of said at least one surface is quasi-amorphous and the atom/atom, oxygen/carbon ratio of the quasi-amorphous areas is the same or greater than that ratio in the semi-crystalline polymer.

26. The process of claim 24 wherein said at least one polymeric article is in the form of a layer, sheet, film or coating and said heating provides said areas with the same crystallite orientation as said semicrystalline polymer.

27. The process of claim 25 wherein said at least one polymeric article is in the form of a layer, sheet, film or coating.

28. The process of claim 24 wherein said quasi-amorphous area has a thickness in the range of 20 to 500 nm and has an optical density, in the absence of dyes or pigments, which differ from that of the semicrystalline polymer by less than 0.1 in the visible region of the electromagnetic spectrum.

29. The process of claim 25 wherein said quasi-amorphous area has a thickness in the range of 20 to 500 nm and has an optical density, in the absence of dyes or pigments, which differ from that of the semicrystalline polymer by less than 0.1 in the visible region of the electromagnetic spectrum.

30. The process of claim 26 wherein said quasi-amorphous area has a thickness in the range of 20 t 500 nm and has an optical density, in the absence of dyes or pigments, which differ from that of the semicrystalline polymer by less than 0.1 nm in the visible region of the electromagnetic spectrum.

31. The process of claim 26 wherein the crystallite orientation o said semicrystalline polymer is biaxial orientation.

32. The process of claim 30 wherein the crystallite orientation of said semicrystalline polymer is biaxial orientation.

* * * * *